United States Patent [19]
Joos et al.

[11] Patent Number: 5,729,967
[45] Date of Patent: Mar. 24, 1998

[54] METHOD OF OPERATING A GAS TURBINE ON REFORMED FUEL

[75] Inventors: Franz Joos, Weilheim-Bannholz, Germany; Timothy Griffin, Ennetbaden; Hans Koch, Zürich, both of Switzerland

[73] Assignee: ABB Research Ltd., Zurich, Switzerland

[21] Appl. No.: 698,592

[22] Filed: Aug. 16, 1996

[30] Foreign Application Priority Data

Oct. 2, 1995 [DE] Germany .................. 195 36 836.3

[51] Int. Cl.$^6$ .................................................. F02C 3/28
[52] U.S. Cl. .................. 60/39.06; 60/39.12; 60/723
[58] Field of Search .................. 60/39.02, 39.06, 60/39.12, 723

[56] References Cited

U.S. PATENT DOCUMENTS

| | | |
|---|---|---|
| 5,048,284 | 9/1991 | Lywood et al. . |
| 5,133,180 | 7/1992 | Horner et al. .................. 60/39.12 |
| 5,165,244 | 11/1992 | Spandaccini et al. .................. 60/723 |
| 5,395,235 | 3/1995 | Hung . |
| 5,490,377 | 2/1996 | Janes .................. 60/39.12 |

FOREIGN PATENT DOCUMENTS

| | | |
|---|---|---|
| 5-256165 | 10/1993 | Japan . |
| WO92/20963 | 11/1992 | WIPO . |

*Primary Examiner*—Louis J. Casaregola
*Attorney, Agent, or Firm*—Burns, Doane, Swecker & Mathis

[57] ABSTRACT

In a method for the operation of a power station installation which essentially comprises a compressor (4), a combustion unit and a turbine (12), the combustion unit comprising a conditioning stage for at least part of the combustion air and a combustion chamber, a portion (13a) of the compressed air (13) from the compressor (4) is passed through the conditioning stage and there first of all mixed with a quantity of fuel (14a). This mixture then passes into a generator (8), in which at least hydrogen is fractionated, this hydrogen then being used in the combustion chamber. The combustion chamber comprises a start-up burner (1), a catalytic stage (2) and a downstream second combustion stage (3). Both the air/fuel mixture (16a) fractionated in the generator (8) and the further compressor air (13) enter the combustion chamber, in which interdependent combustion occurs between the combustion units acting there, relative to the running up of the installation, for the purpose of minimizing pollutant emissions. (FIG. 1)

3 Claims, 3 Drawing Sheets

METHOD OF OPERATING A GAS TURBINE ON REFORMED FUEL

FIELD OF THE INVENTION

The present invention relates to a method of operating a power station installation with catalytic combustion.

In the case of combustion chambers of power station installations with a wide load range, the problem repeatedly arises of how the combustion can be operated with a high efficiency and with low pollutant emissions. It is primarily the $NO_x$ emissions which are of concern in the majority of cases, but it has transpired that UHC (=unburnt hydrocarbons) and CO emissions will have to be greatly minimized in future. Particularly where it is a matter of using different types of fuel, it has repeatedly been found that the design for one type of fuel, for oil for example, directed towards minimizing a certain pollutant, $NO_x$ emissions for example, cannot be transferred satisfactorily to different types of fuel and different pollutant emissions. In the case of multi-stage combustion chambers, the aim is to run the second stage on a lean mixture. This is only possible, however, if the temperature prevailing at the inlet to the second stage is sufficiently high to ensure that sufficient burn-up can be achieved in the second stage, even in the case of a small quantity of fuel, i.e. the fuel/air mixture in the first stage must be kept largely constant, and although this is possible per se in the case of combustion with the diffusion burners which have been disclosed, for example, it is subject to impermissibly high pollutant emissions.

In contrast, proposals have been disclosed which claim to provide a catalytic stage in the case of multi-stage combustion. Here, the catalytic action may be directed toward conversion of the fuel employed before combustion, for example in the case of a gaseous fuel toward partial conversion into $CO_2$, $H_2O$ or into $H_2$, CO. Basically, the same problems always arise with this method, these problems relating, on the one hand, to the putting into operation and fitness of operation of the catalyst provided with regard to the fuels used and, on the other hand, to the subsequent correct composition of a low-emission combustion mixture.

The provision of a catalytic intermediate combustion stage which acts downstream of a first combustion stage has furthermore been disclosed. This upstream combustion stage has the task of creating the conditions for the downstream catalytic combustion, the intention being that the entire fuel/air mixture formed should be burnt in this catalytic combustion stage. It is obvious that damage to or thermal destruction of the catalyst can easily occur here owing to the unavoidable temperature fluctuations within the combustion upstream of the catalytic stage.

With regard to the pollutant emissions too, the proposals mentioned are unconvincing: the combustion upstream of the catalyst produces its pollutants during the entire period over which it is intended to operate, with the result that there is always as it were a base load of pollutant emissions, which are then added to the remaining emissions from the subsequent combustions, thus making minimization of the pollutant emissions impossible for this reason alone.

It should furthermore not go unrecognized that the conversion—taking place in the catalyst—of the exhaust gases from the preceding combustion can generate new pollutants, the pollutant-related consequences of which have not yet, insofar as can be discerned, been investigated in all aspects, for which reason uncertainty still prevails in this regard.

SUMMARY OF THE INVENTION

Accordingly, one object of the invention is, in the case of a method of the type stated at the outset and in connection with the use of a catalytic stage, to minimize the pollutant emissions in the generation of a hot gas.

The subject matter of the invention includes a circuit, which fundamentally comprises a conditioning stage for the combustion air, which can be either pure air or a fuel/air mixture, and a downstream combustion stage. The essential elements in this circuit are the measures which characterize the operating concept. Start-up is effected by means of a burner which acts downstream of a catalyst and the maximum temperature of which remains limited, as will be explained in greater detail below. The load of the power station installation is raised to about 20% by means of this start-up burner. A switch is then made to a supply of fuel which feeds the catalytic stage itself; the combustion which takes place here occurs at temperatures of up to about 1000° C. A second combustion stage, which acts downstream of the start-up burner and in which the hot gases are conditioned to nominal temperature, is activated. Fundamentally, the start-up burner and the second stage are fed directly with fuel to form a mixture. As already mentioned, separate conditioning of the fuel/air mixture is provided for the catalytic stage. For this purpose, a portion of compressed air is taken from the main stream and first of all preheated. This air is then mixed with a corresponding proportion of fuel with the stipulation that a rich mixture should be achieved. This mixture is then passed through a generator for reforming the mixture into different gas components—thus, inter alia, into hydrogen. This reforming is preferably brought about by means of a catalyst, although noncatalytic reforming is also possible. This reformed combustion air is then conditioned upstream of the catalytic stage with the remaining compressed air and the corresponding quantity of fuel to give a single mixture. The catalytic stage comes into operation only after the start-up burner has been taken into operation with a portion of compressed air and fuel and the load of the installation has been raised, as mentioned above, to about 20%. The catalytic stage and the second combustion stage are then put into operation, the installation thereby being run up both thermally and in terms of load to nominal operation.

The essential advantage of the invention is to be seen in the fact that the catalytic stage is not supplied with hot gases or exhaust gases from a preceding combustion and therefore does not suffer any preloading by pollutants. The catalytic stage is thus operated with an optimum mixture which is matched to the various operating parameters of the catalyst used in the catalytic stage. From the point of view of combustion, the hot gases from the catalyst have a constant temperature and are very low in pollutants.

A further significant advantage of the invention relates to the proportion of hydrogen from a generator in the conditioning stage, which assists combustion particularly in the catalytic stage.

The second combustion stage is fed exclusively or essentially with the low-pollutant hot gases from the catalytic combustion, such that the subsequent increase in temperature is solely responsible for any pollutant emissions. A certain quantity of compressor air can of course be introduced into this second combustion stage, and this should be metered in such a way that the flame temperature which is then established does not lead to any efficiency losses of the installation.

Advantageous and expedient developments of the solution according to the invention of the object are defined in the further dependent claims.

BRIEF DESCRIPTION OF THE DRAWINGS

A more complete appreciation of the invention and many of the attendant advantages thereof will be readily obtained

Figure 1:
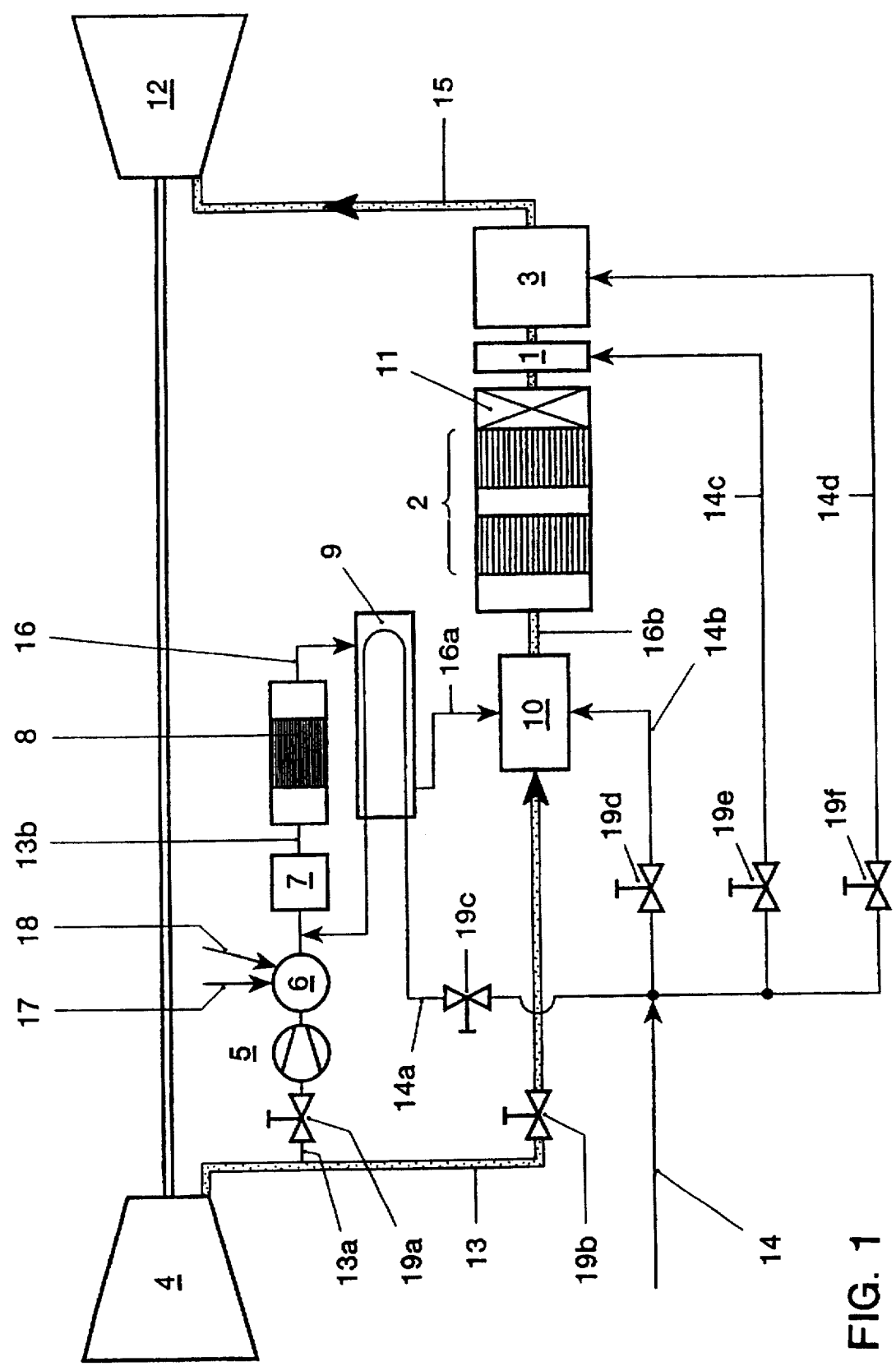

3 as the same becomes better understood by reference to the following detailed description when considered in connection with the accompanying drawings, wherein:

FIG. 1 shows a circuit for a gas turbine with two-stage combustion and with an intermediate catalytic stage.

Figure 2:
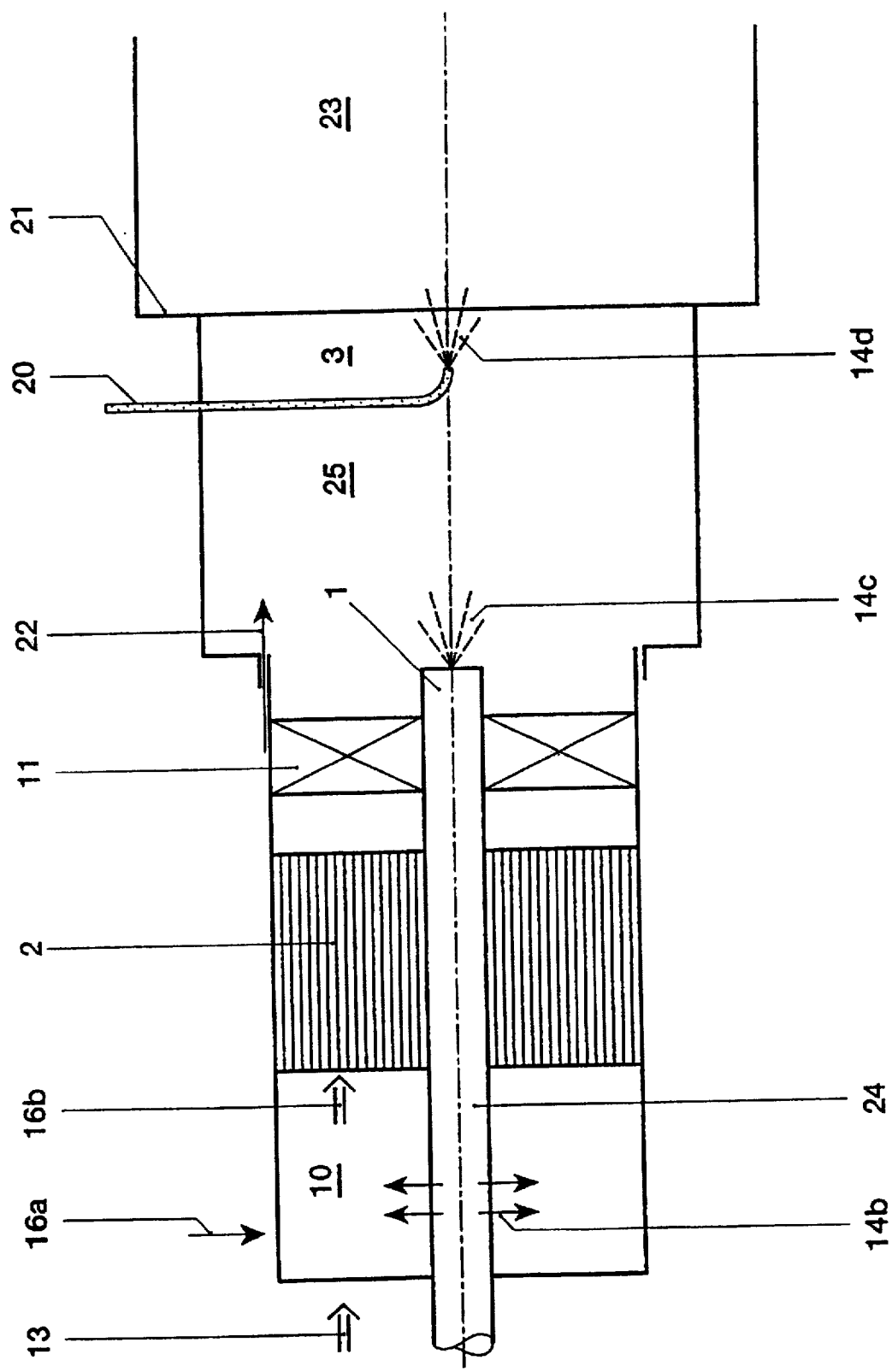

FIG. 2 shows a combustion chamber as part of the above circuit and

Figure 3:
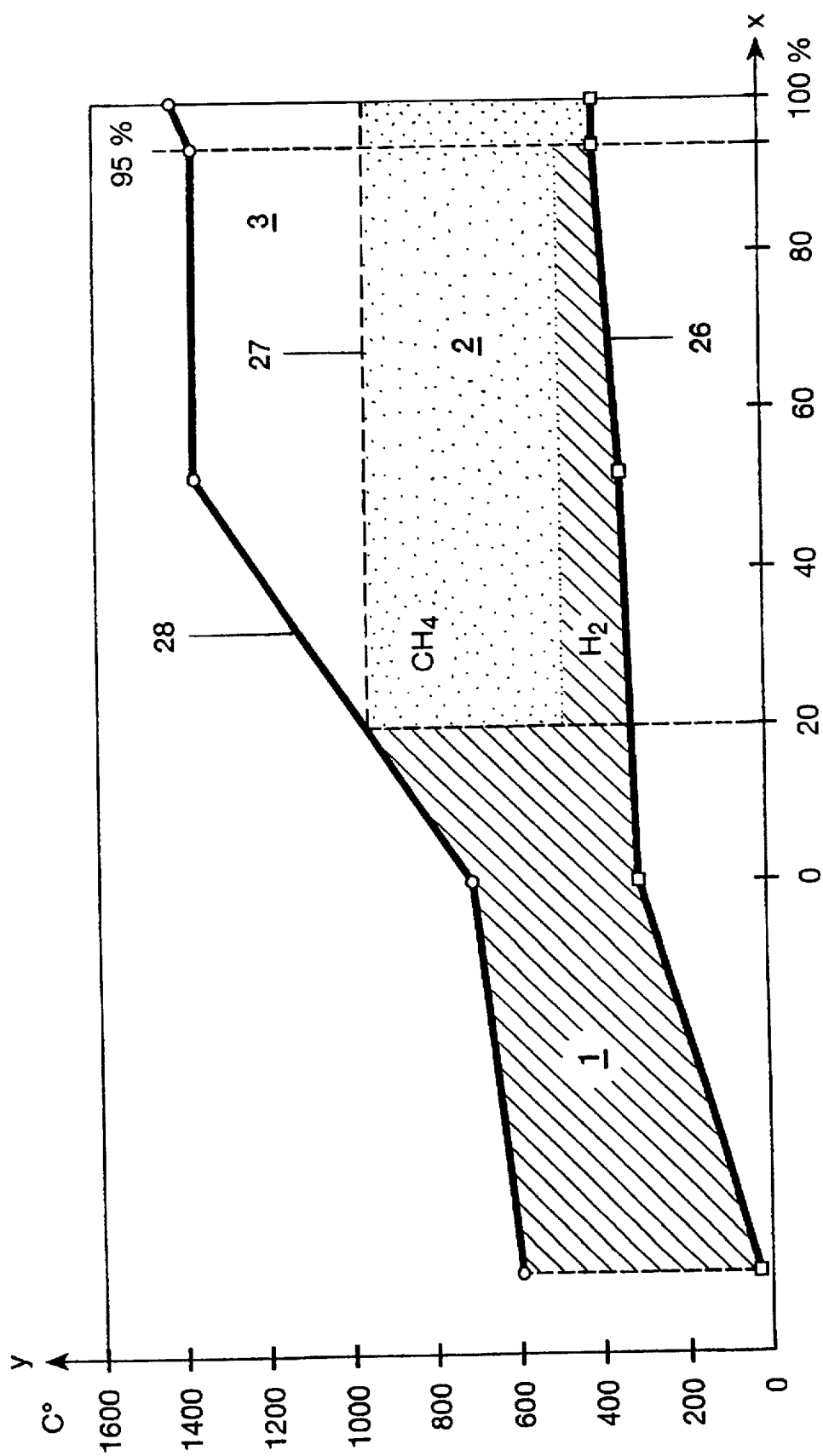

FIG. 3 shows a temperature and load profile for the bringing into operation of the combustion chamber.

DESCRIPTION OF THE PREFERRED EMBODIMENTS

Referring now to the drawings, wherein like reference numerals designate identical or corresponding parts throughout the several views, all elements not required for an immediate understanding of the invention have been omitted and the flow direction of the media is indicated by arrows. FIG. 1 shows the circuit for a gas turbine, the units of which are of conventional construction as regards the hydrodynamic machines. A compressor 4 serves to provide a compressed quantity of air 13, which after undergoing thermal conditioning, is admitted as hot gases 15 to a turbine 12. The exhaust gases from this turbine 12 can then be used, for example, to maintain the operation of a steam circuit as part of a combined-cycle installation. Downstream of the compressor 4, a part 13a of the compressor air 13 is branched off and passed into an auxiliary compressor 5, in which additional compression takes place. This air then flows into a thermal reactor 6, which is fed by a heat source 17. In addition, water 18 is simultaneously injected into this thermal reactor 6, giving rise to an air/steam mixture. Downstream of this thermal reactor 6, this mixture has added to it a quantity of fuel 14a which stems from a central fuel duct 14 and has been passed through a heat exchanger 9 beforehand. In a subsequent mixer 7, a homogeneous mixture is formed, the temperature prevailing there being about 400° C. The mixture 13b built up or composed in this way is then passed into a downstream hydrogen generator 8, in which reforming of the mixture, which there acts as combustion air, into a number of gas components, in particular $N_2$, CO, $N_2$, takes place. For the purpose of moderating the temperature prevailing here, these gas components are passed through the abovementioned heat exchanger 9, through which the likewise abovementioned fuel 14a flows, participating in a heat exchange process. The mixture 16a heated and reformed in this way then flows into a mixing space 10, in which the main mixture formation with a further quantity of fuel 14b is performed. This mixture 16b then flows through a catalytic stage 2. Arranged downstream of this catalytic stage 2 is a swirl generator 11, which acts upstream of a start-up burner 1. Following this start-up burner 1 in the direction of flow is a second combustion stage 3, in which the final conditioning of the hot gases 15 takes place, which are then admitted to the downstream turbine 12. Both the start-up burner 1 and the second combustion stage 3 are operated individually by the introduction of a corresponding quantity of fuel 14c and 14d respectively, which quantities are likewise branched off from a central fuel duct. The exhaust gases from this turbine 12 can be reconditioned to give hot gases for the purpose of sequential combustion, for example, or, as already mentioned, they can be passed into a steam generation process, in which steam is prepared for the purpose of operating a steam turbine. The combustion process of the start-up burner 1, the catalytic stage 2 and the second combustion stage 3 and the interdependence between the individual stages will be explored in greater detail in the description of the figures following. It remains to be stated that the individual branch-offs from the flow of the compressor air 13 and the central fuel duct 14 are controlled by the arrangement of control elements 19a, 19b, 19c, 19d, 19e, 19f of appropriate design for their function.

FIG. 2 shows a practical design of the individual combustion stages in the form of a unitary combustion chamber, which either comprises a single tube or is designed as an annular chamber. In the case of an annular design of the combustion chamber, it can also comprise individual tubes which are arranged around an axis. The compressor air 13 flows into a mixing space 10 which has already been symbolized in FIG. 1 with the same reference numbering and which performs the function of providing the fuel/air mixture for the operation of the catalytic stage 2. Extending between the mixing space 10 and the combustion space 25 of the start-up burner 1 is a central fuel lance 24 which, on the one hand, undertakes the supply of fuel 14b for the total combustion air 13 and 16a to the catalytic stage 2 and, on the other hand, undertakes the fuel supply 14c for the operation of the start-up burner 1. Provisions for the operation of this start-up burner 1 also preferably include a direct path for the introduction of the air required. This provision can likewise be made from outside into the combustion zone 25 of the start-up burner 1 via the central fuel lance 24 or via injection openings 22. Acting downstream of the mixing space 10 is the catalytic stage 2, the combustion in it taking place on the basis of the catalytic coating provided there and of the stages provided. The individual catalyst stages which form the catalytic stage 2 are of appropriate design as regards the flow rate and are coated with different catalytic materials, such that optimum oxidation and/or conversion of the fuel employed is obtained. Careful design should moreover be employed to ensure that certain limits are not exceeded as regards the peak and final temperatures resulting in the catalytic stage 2. The increase in the temperature over the various stages within the catalytic stage 2 should preferably occur successively, and specific attention should be given to the various gas components of the combustion air from stage to stage in their exothermic reaction with the corresponding catalytic material. The ultimate purpose of these measures lies, on the one hand, in an attempt to minimize the pollutant emissions and, on the other hand, in a desire to produce a thermally uniform hot gas from this catalytic stage 2, which hot gas preferably permits combustion without a burner in the downstream second combustion stage 3, i.e. the combustion is to take place by spontaneous ignition of a quantity of fuel 14d injected there. For this purpose, all that is then required is for radially arranged fuel lances 20 for the introduction of the corresponding fuel 14d to be provided at the periphery of the combustion zone 25. Depending on the fuel composition, the temperature required for this purpose will be about 800° C. or more. Since the load of the installation is increased by means of the start-up burner 1 merely to about 20%, the remaining quantity of combustion air must necessarily be passed via the catalytic stage 2. As already mentioned, the swirl generator 11 then intervenes downstream of this stage, initiating the turbulent flow which induces mixture formation and combustion in the second combustion stage 3 according to optimum criteria, specifically as regards a narrowly defined temperature level to ensure minimization of the pollutant emissions and maximization of the efficiency from the combustion. Downstream of the radially arranged fuel lances 20 for the introduction of the fuel 14d which triggers spontaneous ignition, there is an increase in the flow cross section of the subsequent combustion space 23 in relation to the preceding combustion zone 25 by means of a jump 21 in the cross section. There forms in this plane a reverse-flow zone which stabilizes the flame front in this region, such that the possibility of upstream flashback is eliminated, this reverse-flow zone thus exhibiting the properties of a bodyless flame holder.

FIG. 3 shows the variation in the load increase X as a function of the variation in the temperature Y in the various units which form the combustion chamber. The curve 26 represents the temperature variation from the putting into operation of the start-up burner 1. At load zero, the combustion-air temperature for the start-up burner 1 is about 300° C. The use of the start-up burner 1 increases the temperature resulting from this combustion to about 950° C., this corresponding to a load of about 20%. The start-up burner 1 can then be switched off from 20% load since, from this point onwards, the catalytic stage 2 can heat up the combustion air autonomously to 950° C. with the assistance of the quantity of $H_2$ from the generator 8. From this figure it can be seen that the formation, explained with reference to FIG. 1, of a hydrogen component assists the operation of the catalytic stage 2 as regards combustion, the operation of the catalytic stage otherwise largely being maintained by $CH_4$. The temperature at the outlet of this catalytic stage 2 remains at the abovementioned level of about 950° C., as the shape of the curve 27 shows. The subsequent second combustion stage 3 increases the hot-gas temperature to the nominal value while simultaneously increasing the load, as can be seen from the shape of the curve 28. From 95% load onwards, the last upward temperature adjustment takes place, it being possible at 95% load for the compressor outlet temperature to be high enough to be able to dispense with the aid of the generator 8 at full load. As can furthermore be seen from the figure, there is an interdependence between the three combustion stages which is designed to minimize pollutant emissions and maximize the efficiency of the installation.

Obviously, numerous modifications and variations of the present invention are possible in light of the above teachings. It is therefore to be understood that within the scope of appended claims, the invention may be practiced otherwise than as specifically described herein.

What is claimed as new and desired to be secured by Letters Patent of the United States is:

1. A method of operating a power station installation, the power station comprising at least one compressor, at least one combustion unit and at least one turbine, the combustion unit comprising a combustion chamber and a conditioning stage, connected upstream of the combustion chamber, for at least part of the combustion air, the method comprising the steps of:

directing a portion of the compressed air through the conditioning stage, mixing a quantity of fuel with the portion of compressed air and reforming the fuel and air mixture in a hydrogen generator, directing the reformed gases into the combustion chamber, wherein the remaining compressed air likewise flows into the combustion chamber, and operating a start-up burner of the combustion chamber on an individual basis using part of this air, and operating a catalytic stage acting upstream of the start-up burner and likewise belonging to the combustion chamber with a remaining part in conjunction with the reformed mixture from the conditioning stage, wherein the total combustion air heated by the catalytic stage and the start-up burner flows into a downstream second combustion stage, in which a further combustion is carried out to generate hot gases.

2. The method as claimed in claim 1, wherein the reformed mixture contains at least a proportion of hydrogen, which is used at least to operate the catalytic stage.

3. The method as claimed in claim 1, wherein the combustion air which flows into the second combustion stage has been heated sufficiently for spontaneous ignition by injection of fuel.

* * * * *